United States Patent [19]
Boynton et al.

[11] 3,726,465
[45] Apr. 10, 1973

[54] WAVE SOLDERING APPARATUS

[75] Inventors: Kenneth G. Boynton, Milford, N.H.; Thomas R. Diggins, Elk Grove, Ill.

[73] Assignee: Hollis Engineering, Inc., Nashua, N.H.

[22] Filed: Jan. 15, 1971

[21] Appl. No.: 106,801

[52] U.S. Cl. .................228/37, 29/503, 117/114, 118/400, 228/40
[51] Int. Cl. ..............................................B23k 1/08
[58] Field of Search....................228/33, 34, 36, 37, 228/39, 40; 117/113, 114; 118/259, 400; 29/471.1, 503

[56] References Cited

UNITED STATES PATENTS

| | | | |
|---|---|---|---|
| 3,605,244 | 9/1971 | Osborne et al. | 29/471.1 |
| 3,445,919 | 5/1969 | Saba | 228/37 |
| 3,379,356 | 4/1968 | Eith | 228/37 |
| 3,438,386 | 4/1969 | Diggins et al. | 228/37 X |

FOREIGN PATENTS OR APPLICATIONS

| | | | |
|---|---|---|---|
| 798,454 | 7/1958 | Great Britain | 288/37 |

Primary Examiner—J. Spencer Overholser
Assistant Examiner—Robert J. Craig
Attorney—Brumbaugh, Graves, Donohue & Raymond

[57] ABSTRACT

An apparatus for producing a soldering wave having a gradually curved upper soldering surface and including a passage communicating with a reservoir of the solder through a lower intake and having a discharge opening above the level of the solder in the reservoir, a wall forming part of the passage and discharge opening over which the solder flows to form the wave, a downwardly extending return passage having its upper intake in communication with the downstream end of the wave and its lower discharge end beneath the level of the solder in the reservoir, a downwardly sloped wall for supporting the wave between the overflow wall and the upper end of the return passage and lengthening the wave between the upstream and downstream ends thereof, and a flow regulator within the return passage to maintain a column of solder within the return passage at a height substantially above the level of the solder in the reservoir to eliminate turbulence within the wave and the return passage.

8 Claims, 3 Drawing Figures

PATENTED APR 10 1973 3,726,465

INVENTORS.
KENNETH G. BOYNTON &
THOMAS R. DIGGINS
BY
Brumbaugh, Graves, Donohue & Raymond
their ATTORNEYS.

WAVE SOLDERING APPARATUS

This invention relates to wave soldering machines in which a wave of solder is produced above a fountain or reservoir of the solder, and the article to be soldered is moved across the top of the wave to bring the part to be soldered into contact with the wave. Wave soldering machines of this type have been used commercially for various applications, but they are particularly suitable for the rapid soldering of printed circuit boards.

The ideal wave soldering machine should generate an air-free, non-turbulent wave free of dross and oxides and deposit a shiny coating of solder on the contacts to be soldered without forming undesirable icicling and solder bridging of the contacts. The icicling and solder bridging are attributable to the web (sometimes call "backwash") which forms between the printed circuit board and the surface of the wave of solder as the circuit board leaves the solder wave. If this web of solder could be prevented from following the board as it leaves the solder wave, icicling and solder bridging would be eliminated. If the length of this web could be reduced, the incidence of icicling and bridging formations would be correspondingly reduced.

In one type of conventional wave soldering machine which is currently available, a wave is generated by discharging the solder from an elongated nozzle upwardly into the air, causing the solder to travel in an arc and return by gravity to the reservoir while the article to be soldered is moved along a path into engagement with the upper surface of the wave of solder. Since the wave is formed in the air and the solder splashes back into the reservoir, air becomes entrained in the stream and may impede the soldering action of the wave and produce objectionable oxidation of the solder. Moreover, the turbulence produced by the return flow of solder into the reservoir entrains the air within the solder and tends to produce an undesirable bubbling effect and oxidation of the upper surface of the solder.

In another type of wave soldering machine, a double or two directional solder wave is generated from a single upwardly extending elongated nozzle from which the solder overflows in opposite directions. The double or two directional overflowing wave minimizes the tendency for air to become entrained in the solder wave and the solder within the reservoir. Moreover, in the double wave soldering apparatus of the type disclosed in the Wegener et al. U.S. Pat. No. 3,398,873, issued Aug. 27, 1968, the churning of the solder and the tendency to form air bubbles and foam within the solder in the reservoir are further minimized by the provision of return passages which communicate with the discharge ends of the waves and return the solder to the reservoir at regions below the upper level of the solder within the reservoir.

It has been found that icicle and bridge formation can be effectively controlled and that other desirable results can be obtained by introducing an oil into the solder wave. The oil provides an apparent surface tension reducing action which tends to eliminate bridging and icicling particularly when the article to be soldered is moved at a slight incline across the solder wave so that gravity aids in pulling back the web which produces the icicling effect. The presence of oil also prevents the formation of oxides on the surface of the solder, permits the soldering operation to be carried out at lower temperatures, minimizes the deposit of solder on the part to be soldered, imparts a shinier appearance to the solder deposit, and gives considerably more leeway in solder temperature, immersion depth and the speed at which the article must be passed across the solder wave. The two directional soldering wave generating apparatus with provision for mixing oil into the solder wave has proved itself capable of successfully and efficiently mass soldering printed circuits and other articles with minimum icicling and bridging problems.

The object of the present invention is to provide an improved solder wave generating apparatus in which the tendency of the solder to form icicles and bridges is still further reduced to such an extent that comparable or better results can be achieved even without the use of an oil than heretofore could be obtained with the two directional solder wave generating apparatus with provision for introducing oil into the solder wave. Toward this end the apparatus of the present invention provides a unidirectional air-free wave having a gradually curved upper soldering surface of substantially increased length between the upstream and downstream ends of the wave, thereby greatly decreasing the length of the web or backwash formed as the printed circuit leaves the soldering wave. By substantially decreasing the length of this web, the icicling and bridging tendency is decreased so significantly that highly satisfactory soldering can be carried out even without the presence of oil.

These objects are achieved in the apparatus of the present invention by lifting the solder above the reservoir through an upwardly extending passage, permitting the solder to overflow one wall of the upper discharge end of the passage to form a wave having a gradually curved upper soldering surface and supporting the downstream end of the wave by flowing it across a downwardly sloped wall before returning the solder through a return passage to the lower region of the reservoir. The downwardly sloped supporting wall for the downstream end of the wave lengthens the wave between the upstream and downstream ends thereof and decreases the curvature of the upper soldering surface of the wave, thereby decreasing the length of the web or backwash which tends to produce the objectionable icicling and bridging. In the preferred form of the apparatus, the length of the wave between the upstream and downstream ends thereof is further increased and the curvature of the upper surface thereof further decreased by utilizing an upwardly extending passage in which the front overflow wall diverges away from the back wall in an upward direction.

Also, in the preferred form of the apparatus, a flow regulator is provided within the return passage to maintain a column of solder within the return passage at a height substantially above the level of the solder in the reservoir to eliminate turbulence within the wave and the return passage and prevent air from entering into the system.

For a complete understanding of the present invention reference can be made to the detailed description which follows and to the accompanying drawing in which.

Figure 2:
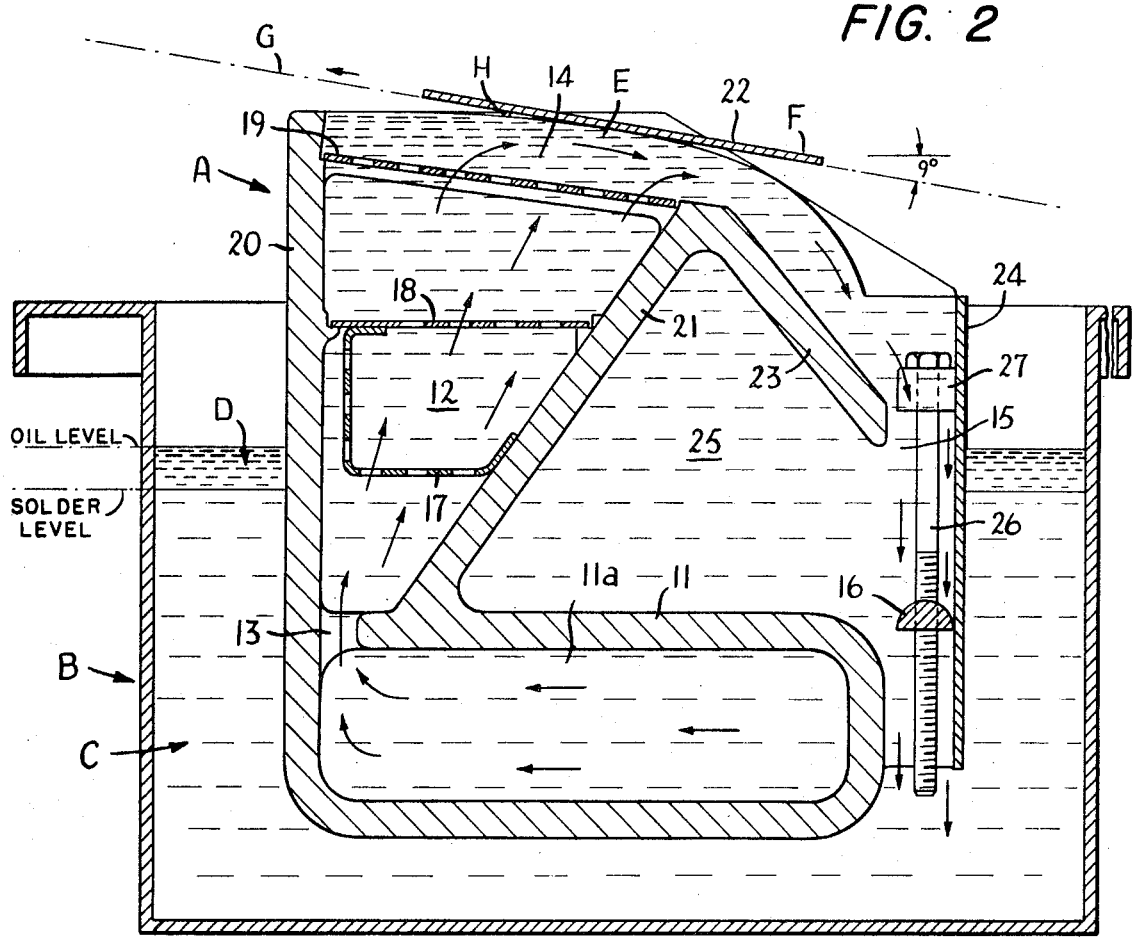
FIG. 2 is a cross-sectional view taken along the line 2—2 of FIG. 1, looking in the direction of the arrows.
Figure 1:
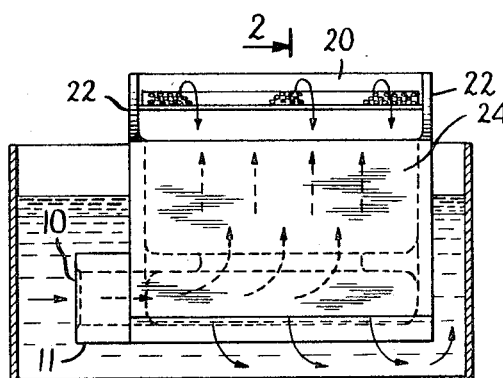
FIG. 1 is a schematic front elevational view of the wave generating apparatus of the present invention with the solder reservoir shown in cross-section.
Figure 3:
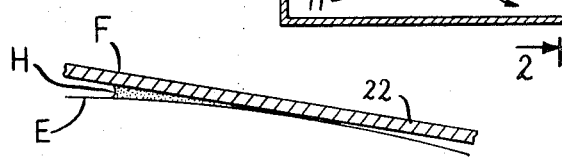
FIG. 3 is an enlarged schematic view of a portion of FIG. 1.

The wave generating apparatus A of the present invention is partially submerged in a reservoir B containing molten solder C which may or may not have a layer of oil D floating on top of the solder.

The wave generating apparatus A includes an intake 10, a tubular housing 11 enclosing an intake chamber 11a which extends transversely across the lower region of the wave generating apparatus, an upwardly extending passage 12 communicating at the lower end thereof with the chamber 11a through a restricted elongated connection 13, a discharge opening 14 of relatively large cross-sectional area at the upper end of said passage 12 for generating a wave of solder E by the controlled overflow, a downwardly extending return passage 15 for returning the solder to the lower region of the reservoir, and a flow regulating means 16 within the return passage to maintain a desired column of liquid solder within the return passage to eliminate turbulence within the wave and the return passage.

A pump (not shown) submerged within the reservoir supplies the solder from the reservoir to the intake 10 of the wave generating apparatus. The pump can also supply a mixture of oil and solder to the intake 10. The apparatus for supplying the oil-solder mixture is the subject of the Walker et al. U.S. Pat. No. 3,058,441, issued Oct. 16, 1962.

The solder is introduced into the chamber 11a at one end wherein it changes its direction 90° and rises through the elongated restricted opening 13. The solder then flows upwardly through the passage 12, passing through a series of horizontally extending baffles 17, 18 and 19 which uniformly distribute the flow of the solder over the full extent of the passage 12.

The upwardly extending passage 12 is defined by a vertically extending rear wall 20, an upwardly extending diagonal front wall 21 and a pair of vertical end walls 22 which cooperate to form a throat of uniformly increasing cross-sectional area from the lower end to the upper end. The diverging rear and front walls of the passage 12 increase the length of the wave between the upstream and downstream ends thereof.

The front wall 21 is lower in height than the rear and end walls 20 and 22, respectively, so that it serves as an overflow wall to generate a wave of solder having a gradually curved upper surface across which the printed circuit F or other article to be soldered is moved, preferably along a path G inclined at least 5° and preferably about 9° from the horizontal.

The wave flows across the downwardly sloped wall 23 which is formed integrally with the upper end of the wall 21, supporting the wave as it flows toward the return passage 15 and decreasing the curvature of surface of the wave into which the lower surface of the printed circuit board is brought into engagement.

The return passage 15 is separated from the solder within the reservoir by an upstanding wall 24 which extends between the forward ends of the walls 22. The solder flows downwardly through the return passage, passing between the forward edge of the sloped wall 23 and the wall 24, past a reservoir 25 in open communication with the return passage and then between the front of the housing 11 and the walls 24 into the lower region of the reservoir.

The flow of solder through the return passage 15 is controlled by the position of the flow regulating means 16, preferably a vertically adjustable bar which extends horizontally entirely across the return passage. The bar is supported by screws 26 depending from bosses 27 mounted on the wall 24. The bar 16 is preferably located intermediate the reservoir 25 and the upper end of the housing 11 so that the return flow from the lower discharge end of the return passage is reduced as the bar 16 is lowered and increased as the bar is raised.

The bar 16 will ordinarily be adjusted to maintain a full column of solder within the return passage or, that is to say, to maintain the upper level of the solder at approximately the height of the wall 24. This adjustment makes it possible to generate a gently and continuously flowing unidirectional wave of gradual curvature from the rear wall 20 to the upper end of the return passage 15, eliminating turbulence within the wave and the return passage which would otherwise introduce air and foam into the reservoir.

The circuit boards F are carried seriatim by a conveyor along the inclined path G to bring the lower surfaces of the boards and the contacts thereon to be soldered across and in engagement with the curved upper surface of the wave. As the board leaves the soldering wave a relatively small backwash web H will tend to form between the surfaces of the board and wave, and as explained above, the tendency of the wave to form icicle and bridges is a function of the size of this web. The size of the web H produced by the apparatus of the present invention will be relatively small in comparison to high peaked conventional soldering waves having upper surfaces of substantially greater curvature. Because the wave generated by the apparatus of the present invention is of greater length between the upstream and downstream ends thereof and has an upper soldering surface of less curvature than the waves generated by conventional apparatus, the size of the backwash web H is so small that there is less tendency for icicle and solder bridges to form even without the presence of oil. Also, the printed circuit board is maintained in contact with the solder wave over a longer period of time, thereby increasing the time-temperature relationship which is essential for high quality soldering.

The wave generating apparatus has been tested by soldering printed circuit boards at temperatures of 385° to 510° F. and at conveyor speeds of between 2 and 20 feet per minute, preferably about 12 feet per minute, without mixing oil in the solder wave, and in general the soldering results have been comparable to conventional two directional soldering waves containing a mixture of oil. The wave generated was smooth, oil and dross free, about one-half inch deep at the soldering surface thereof and flowing at a velocity of approximately 18 to 24 inches per second. The boards were preheated to a temperature of about 200° F. as measured on the top sides of the boards.

The invention has been shown in a single preferred form and by way of example, and many modifications and variations may be made therein without departing from the spirit of the invention. The invention, therefore, is not to be limited to any specified form or embodiment, except insofar as such limitations are set forth in the claims.

We claim:

1. An apparatus for producing a soldering wave having a gradually curved upper soldering surface of relatively long length in the direction of flow comprising means forming a passage in communication with a reservoir of solder through a lower intake and having a discharge opening at the top above the level of the solder in the reservoir, a relatively low wall forming part of the passage and discharge opening and over which the solder flows to form the wave, a relatively high wall opposite the overflow wall, the said overflow wall diverging from the higher wall to enlarge the discharge opening defined therebetween in the direction of the flow of the wave, means defining a downwardly extending return passage having its upper intake end in communication with the downstream end of the wave substantially downstream of the useful part of the wave and its lower discharge end beneath the level of the solder in the reservoir; and a downwardly sloped wall for supporting the wave between the overflow wall and the upper end of the return passage and for lengthening the wave between the upstream and downstream ends of the wave and decreasing the curvature of the upper surface of the wave.

2. An apparatus as set forth in claim 1 including a flow regulating means within the return passage to maintain a column of solder within the return passage at a height substantially above the level of the solder in the reservoir to eliminate turbulence within the wave and the return passage.

3. An apparatus as set forth in claim 1 including an upstanding wall spaced apart from the lower end of the downwardly sloped wall and forming a wall of the return passage, the upper end of said upstanding wall and the lower end of said downwardly sloped wall defining a portion of the return passage.

4. An apparatus as set forth in claim 1 including means defining a reservoir of solder beneath the downwardly sloped wall in communication with the return passage between the upper intake and lower discharge ends thereof.

5. An apparatus as set forth in claim 4 including means defining a restricted lower discharge from the return passage below said reservoir and in which the flow regulating means is a horizontally adjustable bar in communication with the reservoir and adjustable vertically toward and away from the restricted discharge passage to regulate the column of solder maintained within the return passage.

6. An apparatus as set forth in claim 1 including a tubular housing at the lower region of the apparatus enclosing an intake chamber and having an intake opening at one end and an elongated, restricted, transversely extending passage connecting the intake chamber with the lower end of the upwardly extending passage.

7. An apparatus as set forth in claim 6 in which the means defining the return passage includes an upstanding wall and a pair of end walls for separating the return passage from the solder within the reservoir, the upstanding wall being spaced apart at its upper end from the lower end of the downwardly sloped wall and spaced apart at its lower end from the front of the tubular housing to form the return flow passage.

8. An apparatus as set forth in claim 6 including a reservoir of solder in communication with said return passage intermediate the upper and lower ends thereof and defined by the upper surface of the tubular housing and the lower surfaces of the overflow wall and the wall which slopes downwardly from the upper end of said overflow wall.

* * * * *